(12) United States Patent
Cruz et al.

(10) Patent No.: US 10,509,849 B2
(45) Date of Patent: Dec. 17, 2019

(54) USER INTERFACE NAVIGATION SYSTEM AND METHOD

(71) Applicant: Change Healthcare Holdings, LLC, Nashville, TN (US)

(72) Inventors: Ismael Cruz, Durham, NC (US); Debora Sinclair, Durham, NC (US); Nataraja Thuppanna, Morrisville, NC (US)

(73) Assignee: CHANGE HEALTHCARE HOLDINGS, LLC, Nashville, TN (US)

(*) Notice: Subject to any disclaimer, the term of this patent is extended or adjusted under 35 U.S.C. 154(b) by 40 days.

(21) Appl. No.: 15/597,902

(22) Filed: May 17, 2017

(65) Prior Publication Data
US 2018/0336169 A1 Nov. 22, 2018

(51) Int. Cl.
*G06F 17/22* (2006.01)
*G06F 3/0484* (2013.01)
*G06F 16/954* (2019.01)
*G06F 16/958* (2019.01)
*G06F 16/957* (2019.01)

(52) U.S. Cl.
CPC ...... *G06F 17/2235* (2013.01); *G06F 3/04842* (2013.01); *G06F 16/954* (2019.01); *G06F 16/958* (2019.01); *G06F 16/9577* (2019.01)

(58) Field of Classification Search
CPC .................. G06F 17/30873; G06F 17/2235
USPC ........................................................ 715/208
See application file for complete search history.

(56) References Cited

U.S. PATENT DOCUMENTS

| 8,782,736 B1 | 7/2014 | Thuppanna et al. |
| 2006/0123361 A1* | 6/2006 | Sorin ................ G06F 17/30873 715/854 |

OTHER PUBLICATIONS

Wikipedia,"Breadcrumb (navigation)," at least 2016 https://en.wikipedia.org/wiki/Breadcrumb_(navigation) https://web.archive.org/web/20160202185719/https://en.wikipedia.org/wiki/Breadcrumb_(navigation) (Year: 2016).*

* cited by examiner

*Primary Examiner* — Shawn S Joseph
(74) *Attorney, Agent, or Firm* — Alston & Bird LLP (57) ABSTRACT

A user interface navigation system, method and computer program product facilitate the development of and navigation between web pages. In this regard, a memory device maintains, for a web page, a label and an address for the respective web page and data associated with the respective web page. The system also includes user input circuitry to receive a selection of a link to the web page and navigation circuitry to dynamically create and access the web page in response to link selection. The navigation circuitry dynamically creates the web page by accessing the label, the address and the data, creates breadcrumb text to supplement a hyperlink trail to the web page and obtains content for the web page from a location identified by the address and in accordance with the data. The navigation circuitry accesses the web page by causing the web page to be displayed.

20 Claims, 7 Drawing Sheets

Figure 7

USER INTERFACE NAVIGATION SYSTEM AND METHOD

TECHNOLOGICAL FIELD

A user interface navigation system, method and computer program product are provided in accordance with an example embodiment in order to facilitate navigation between web pages as well as to facilitate the original development of the web pages.

BACKGROUND

Users of computer resources frequently access web pages in order to retrieve information and/or to provide information. The web pages may be accessible via the Internet, an intranet or other network including proprietary networks. Users commonly access a series of web pages, such as by progressing from a root web page to more detailed web pages. Thus, a navigation path may be defined based upon the series of hyperlinks selected by the user in order to navigate to the respective web pages.

In order to facilitate navigation through the web pages, a developer of a web site must generally define the hyperlink to each of the individual web pages in advance, regardless of whether a user ever endeavors to access the web pages. The definition of the hyperlink for each web page may require a developer to expend at least some development time and resources, such as to wrap the hyperlink in an anchor tag, one attribute of which that must be defined being the hypertext reference (href) that defines the Uniform Resource Locator (URL) for the target web page and the clickable anchor text that appears on the web page from which the target web page is accessed. Additionally, the developer must generally construct the target web page including the content of the web page and the hyperlink trail that leads to the respective web page.

Users may sometimes wish to access a prior web page that was previously accessed, but from which the user has since navigated away. In order to access the prior web page, the user may actuate a "back" button or may otherwise indicate their desire to return to the prior web page, such as by selecting a hyperlink associated with the prior web page. In some instances, efforts to return to a prior web page may cause the user to return, instead, to the root web page. In this instance, the user must then again follow the navigation sequence that leads from the root web page to the web page of interest, thereby increasing the user input required to return to the prior web page and decreasing the efficiency of the navigation sequence. In instances in which efforts to return to a prior web page cause a reversion to the root web page as well as in instances in which the prior web page is accessed more directly, user data that was previously provided in conjunction with the prior web page will not generally be available. For example, data regarding selections by the user in conjunction with the user's earlier interaction with the prior web page may not be reflected upon return to the prior web page and, as such, the user may again be required to make those same selections, presuming the user recalls the prior selections. In any event, the reentry of the data associated with the prior web page decreases the efficiency with which the user is able to interact with the various web pages of the navigation path.

BRIEF SUMMARY

A user interface navigation system, method and computer program product are provided in accordance with an example embodiment in order to facilitate the development of web pages and the subsequent navigation between web pages. In this regard, the user interface navigation system, method and computer program product are configured to dynamically create and access a web page in response to access the selection of a link to the web page. Additionally, the user interface navigation system, method and computer program product are configured to supplement the hyperlink trail to the web page in response to selection of the link to the web page. As such, the user interface navigation system, method and computer program product allow for web pages and the corresponding hyperlinks to be created more efficiently and upon demand, so as to reduce the demands upon the developer and to reduce the processing demands placed upon the computer system that hosts the web site by only creating those web pages that are actually accessed, as opposed to creating and storing all possible web pages in advance without knowing whether the web pages will actually be accessed.

In an example embodiment, a user interface navigation system is provided that includes a memory device configured to maintain, for a web page, a label for the respective web page, an address for the respective web page and data associated with the respective web page. The user interface navigation system also includes user input circuitry configured to thereafter receive a selection of a link to the web page and navigation circuitry configured to dynamically create and access the web page in response to the selection of the link. The navigation circuitry is configured to dynamically create the web page by accessing the label, the address and the data from the memory device, create breadcrumb text to supplement a hyperlink trail to the web page and obtain content for the web page from a location identified by the address and in accordance with the data. The navigation circuitry is also configured to access the web page by causing the web page including the content that has been obtained to be displayed.

The user interface navigation system of an example embodiment also includes a hyperlink maintenance circuitry configured to supplement the hyperlink trail to the web page so as to include the breadcrumb text. In an embodiment in which the address comprises a uniform reference locator (URL), the navigation circuitry may be configured to obtain content for the web page by calling the URL and obtaining content for the web page from the location identified by the URL and in accordance with the data. The navigation system of an example embodiment is further configured to dynamically create an actuable hyperlink for the web page in response to the selection of the link. In this embodiment, the user input circuitry is further configured to receive a selection of another web page from within the web page that is currently displayed and the navigation circuitry is further configured, in response to the selection of the another web page, to dynamically create and access the another web page and cause the another web page to be displayed. In this embodiment, the user interface navigation system also includes hyperlink maintenance circuitry configured to update, in response to the selection of the another web page, the hyperlink trail to replace the breadcrumb text associated with the web page displayed upon the selection of the another web page with the actuable hyperlink for the web page and to include the breadcrumb text associated with the another web page.

The user input circuitry of an example embodiment is further configured to receive the selection of a hyperlink from the hyperlink trail. In this example embodiment, the user interface navigation system further includes hyperlink maintenance circuitry configured to remove the breadcrumb text and any hyperlinks from the hyperlink trail that follow the hyperlink that has been selected. Additionally, the hyperlink maintenance circuitry of this example embodiment may be further configured to disable hyperlink capability for the hyperlink that has been selected.

In another example embodiment, a method is provided for facilitating user interface navigation. The method includes maintaining, for a web page, a label for the respective web page, an address for the respective web page and data associated with the respective web page. The method also includes receiving a selection of a link to the web page and dynamically creating and accessing the web page in response to the selection of the link. In this regard, dynamically creating the web page includes accessing the label, the address and the data from the memory device, creating breadcrumb text to supplement a hyperlink trail to the web page and obtaining content for the web page from a location identified by the address and in accordance with the data. Additionally, accessing the web page includes causing the web page including the content that has been obtained to be displayed. The method of an example embodiment also includes supplementing the hyperlink trail to the web page so as to include the breadcrumb text. In an embodiment in which the address comprises a uniform reference locator (URL), the method may obtain content for the web page by calling the URL and obtaining content for the web page from the location identified by the URL and in accordance with the data.

In an example embodiment, the method also includes dynamically creating an actuable hyperlink for the web page in response to the selection of the link. The method of this example embodiment may also include receiving a selection of another web page from within the web page that is currently displayed. In response to the selection of the another web page, the method may also include dynamically creating and accessing the another web page and causing the another web page to be displayed and updating the hyperlink trail to replace the breadcrumb text associated with the web page displayed upon the selection of the another web page with the actuable hyperlink for the web page and to include the breadcrumb text associated with the another web page. The method of an example embodiment also includes receiving the selection of a hyperlink from the hyperlink trail and removing the breadcrumb text and any hyperlinks from the hyperlink trail that follow the hyperlink that has been selected. The method of this example embodiment may also include disabling hyperlink capability for the hyperlink that has been selected.

In a further example embodiment, a computer program product is provided that is configured to provide user interface navigation. The computer program product includes at least one non-transitory computer-readable storage medium having computer-executable program code instructions stored therein with the computer-executable program code instructions comprising program code instructions configured to maintain, for a web page, a label for the respective web page, an address for the respective web page and data associated with the respective web page. The computer-executable program code instructions also include program code instructions configured to receive a selection of a link to the web page and to dynamically create and access the web page in response to the selection of the link. The program code instructions configured to dynamically create the web page include program code instructions configured to access the label, the address and the data, create breadcrumb text to supplement a hyperlink trail to the web page and obtain content for the web page from a location identified by the address and in accordance with the data. The program code instructions configured to access the web page include program code instructions configured to cause the web page to include the content that has been obtained to be displayed.

The computer-executable program code instructions of an example embodiment further include program code instructions configured to supplement the hyperlink trail to the web page so as to include the breadcrumb text. In an embodiment in which the address comprises a uniform reference locator (URL), the program code instructions configured to obtain content for the web page include program code instructions configured to call the URL and obtain content for the web page from the location identified by the URL and in accordance with the data. The computer-executable program code instructions of an example embodiment further include program code instructions configured to dynamically create an actuable hyperlink for the web page in response to the selection of the link. In this example embodiment, the computer-executable program code instructions may also include program code instructions configured to receive a selection of another web page from within the web page that is currently displayed and, in response to the selection of the another web page, dynamically create and access the another web page and cause the another web page to be displayed as well as to update, in response to the selection of the another web page, the hyperlink trail to replace the breadcrumb text associated with the web page displayed upon the selection of the another web page with the actuable hyperlink for the web page and to include the breadcrumb text associated with the another web page. In an example embodiment, the computer-executable program code instructions further include program code instructions configured to receive the selection of a hyperlink from the hyperlink trail, remove the breadcrumb text and any hyperlinks from the hyperlink trail that follow the hyperlink that has been selected and disable hyperlink capability for the hyperlink that has been selected.

BRIEF DESCRIPTION OF THE DRAWINGS

Having thus described certain embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

A user interface navigation system 10, method and computer program product are provided in order to facilitate the efficient development of and navigation between web pages of a web site. In this regard, the user interface navigation system 10, method and computer program product facilitate the dynamic creation and access of a web page in response to the selection of a link associated with the web page. Thus, the developer need not write custom code and create all of the web pages of a web site, but can, instead, provide information sufficient to permit the web pages to be dynamically created if and when the web pages are selected, such as by a user. Consequently, the user interface navigation system 10, method and computer program product facilitate the development of web pages and increase the efficiency with which a web site is developed by limiting the expenditure of processing and memory resources to only those web pages that are accessed by a user. Additionally, the user interface navigation system 10, method and computer program product of an example embodiment are configured to permit the user to more efficiently navigate directly between web pages and to avoid the resubmittal of data when returning to a prior web page, thereby permitting the computer system that hosts the web pages to operate more efficiently.

Figure 1:
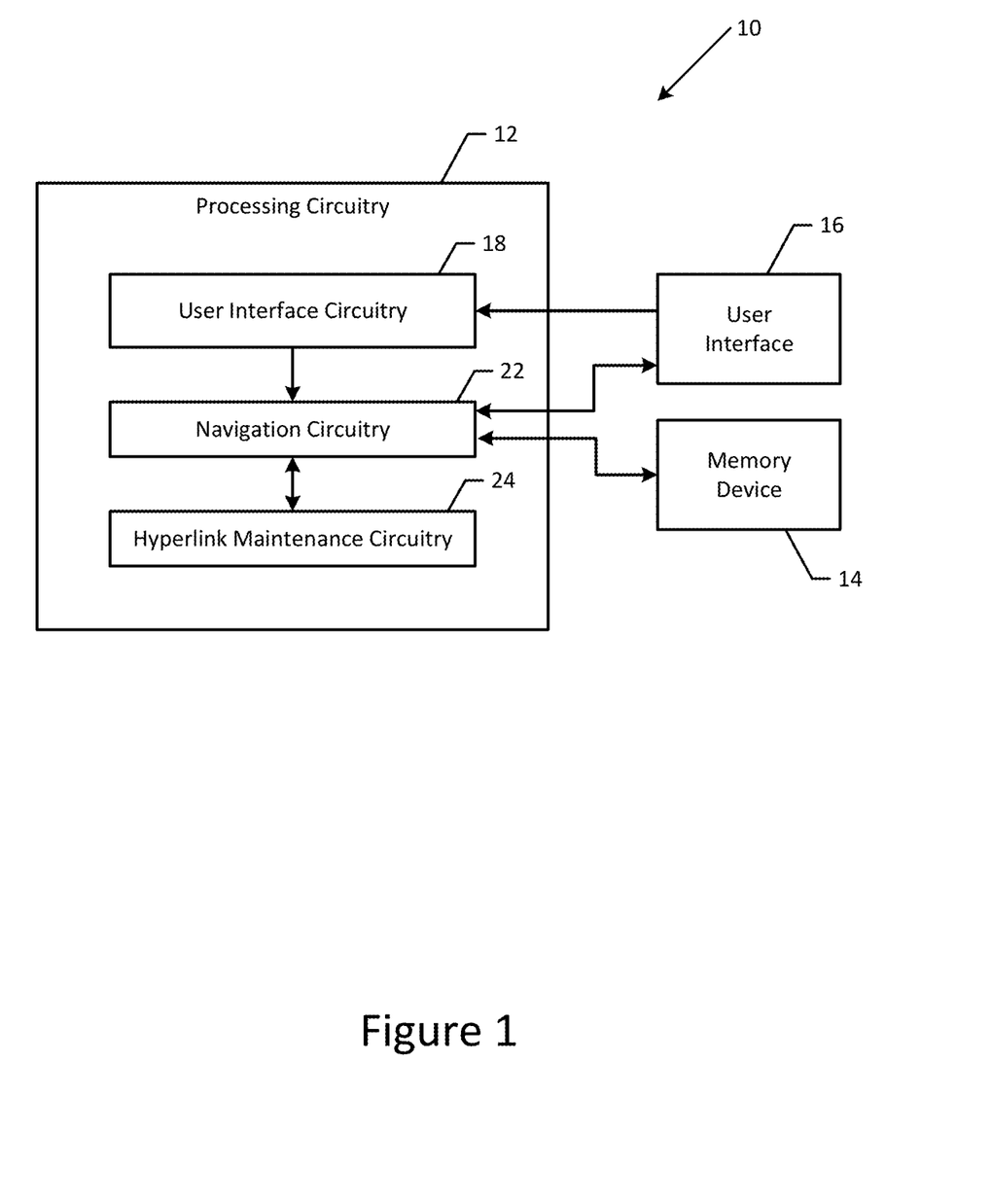
FIG. 1 is a block diagram of a user interface navigation system in accordance with an example embodiment of the present disclosure.

The user interface navigation system 10 may be embodied by a variety of computing devices including a server, a computer workstation, a plurality of network computers or the like. Regardless of the type of computing device that embodies the user interface navigation system 10, the user interface navigation system of an example embodiment includes processing circuitry 12 and a memory device 14 as shown, for example, in FIG. 1. As is also shown in FIG. 1, the user interface navigation system 10 of an example embodiment may additionally include a user interface 16. However, other embodiments of the user interface navigation system 10 do not include a user interface, at least not a user interface configured to directly receive input from a user but, instead, may receive user input from the user interface of another computing device, such as a client device, that is in communication with the user interface navigation system via a communication interface. As such, the user interface 16 of FIG. 1 is provided for sake of clarity in the ensuing discussion but need not necessarily be included by the user interface navigation system 10.

The processing circuitry 12 may be embodied in a number of different ways. For example, the processing circuitry 12 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. The processing circuitry 12 may be embodied on a single computing device or distributed across a plurality of computing devices collectively configured to function as the user interface navigation system 10. In some example embodiments, the processing circuitry 12 may be configured to execute instructions stored in the memory device 14 or otherwise accessible to the processing circuitry. As such, whether configured by hardware or by a combination of hardware and software, the processing circuitry 12 may represent an entity (e.g., physically embodied in circuitry) capable of performing operations according to embodiments of the present invention while configured accordingly. Thus, for example, when the processing circuitry 12 is embodied as an ASIC, FPGA, or the like, the processing circuitry may be specifically configured hardware for conducting the operations described herein. Alternatively, as another example, when the processing circuitry 12 is embodied as an executor of software instructions, the instructions may specifically configure the processor to perform one or more operations described herein.

As shown in FIG. 1, the processing circuitry 12 may include or otherwise be in communication with several specifically configured types of circuitry configured to perform different functions as described below. In this regard, the processing circuitry 12 of an example embodiment includes or is in communication with user interface circuitry 18, navigation circuitry 22 and optionally hyperlink maintenance circuitry 24. In one embodiment, the processing circuitry 12 embodies one or more of the user interface circuitry 18, navigation circuitry 22 and/or hyperlink maintenance circuitry 24. Alternatively, the user interface circuitry 18, navigation circuitry 22 and/or hyperlink maintenance circuitry 24 may be discrete circuitry, separate from, but in communication with, the processing circuitry 12. In this alternative embodiment, each of the user interface circuitry 18, navigation circuitry 22 and/or hyperlink maintenance circuitry 24 may be embodied in any of the various manners described above with respect to the processing circuitry 12 including embodiments comprised exclusively of hardware or embodiments in which the execution of software by hardware serves to specifically configure the hardware to perform the respective functions.

In some example embodiments, the memory device 14 may include one or more non-transitory memory devices such as, for example, volatile and/or non-volatile memory that may be either fixed or removable. In this regard, the memory device 14 may comprise a non-transitory computer-readable storage medium. It will be appreciated that while the memory device 14 is illustrated as a single memory, the memory device may comprise a plurality of memories. The plurality of memories may be embodied on a single computing device or may be distributed across a plurality of computing devices. The memory device 14 may be configured to store information, data, applications, computer program code, instructions and/or the like for enabling the user interface navigation system 10 to carry out various functions in accordance with one or more example embodiments.

The memory device 14 may be configured to buffer input data for processing by the processing circuitry 12. Additionally or alternatively, the memory device 14 may be configured to store instructions for execution by the processing circuitry 12. In some embodiments, the memory device 14 may include one or more databases that may store a variety of files, contents, or data sets. Among the contents of the memory device 14, applications may be stored for execution by the processing circuitry 12 to carry out the functionality associated with each respective application. In some cases, the memory device 14 may be in communication with one or more of the processing circuitry 12, user interface circuitry 18, navigation circuitry 20, access circuitry 22 and/or hyperlink maintenance circuitry 24 as well as the option user interface 16, for passing information among components of user interface navigation system 10.

In an embodiment of the user interface navigation system 10 that includes a user interface 16, the user interface may be in communication with the processing circuitry 12 and may be configured to receive an indication of a user input and/or to provide an audible, visual, mechanical, or other output to the user. As such, the user interface 16 may include, for example, a keyboard, a mouse, a joystick, a display, a touch screen display, a microphone, a speaker, and/or other input/output mechanisms. As such, the user interface 16 may, in some example embodiments, provide means for user control of managing or processing data access operations and/or the like. In some example embodiments in which user interface navigation system 10 is embodied as a server, cloud computing system, or the like, aspects of user interface may be limited or the user interface may not be present.

Figure 2:
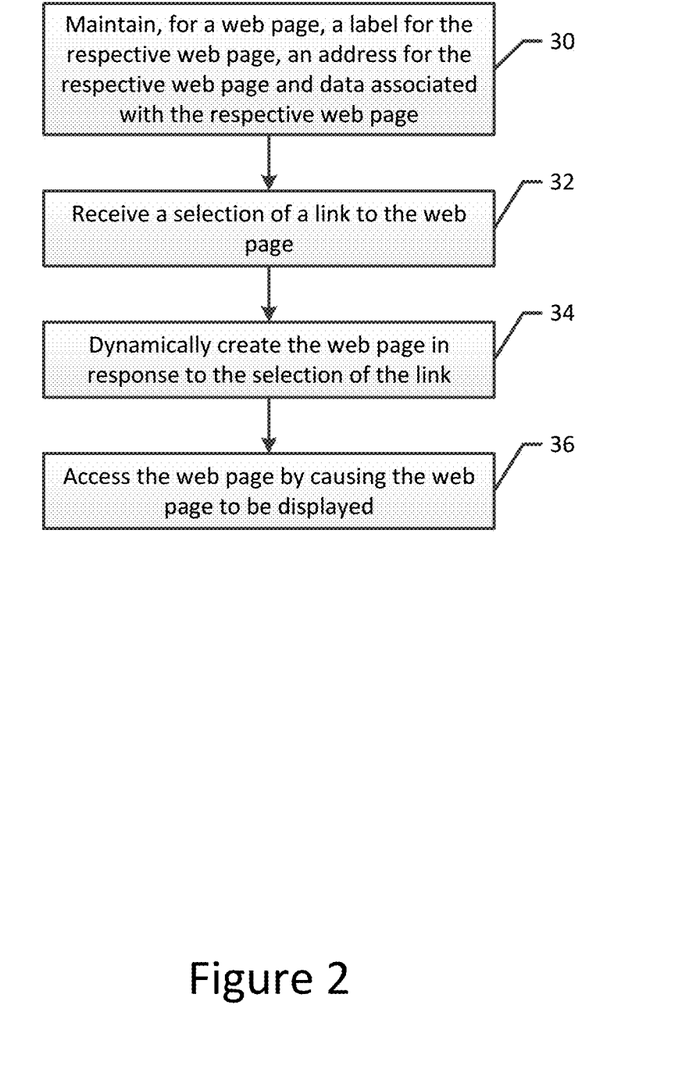
FIG. 2 is a flowchart illustrating operations performed, such as by the user interface navigation system of FIG. 1, in accordance with an example embodiment of the present disclosure.

Referring now to FIG. 2, in the operations performed, such as by the user interface navigation system 10, in accordance with an example embodiment of the present disclosure are depicted. As shown in block 30 of FIG. 2, the user interface navigation system 10 includes means, such as the memory device 14, configured to maintain, for each of a plurality of web pages, a label for the respective web page, an address for the respective web page and data associated with the respective web page including data provided by the website developer and/or data previously submitted by the user, such as during the user's previous interaction with the web page. The label, the address and the data may be provided by a developer during the creation of a web site, such as during the creation of a web page that includes a link to a target web page, and may be associated with the target web page and/or the link thereto. As such, instead of fully developing the target web page, the developer need only provide the label, the address and the data for the target web page such that the target web page can thereafter be dynamically created in response to selection of the link. By providing for dynamic creation of the web pages upon selection of respective links, the developer is able to more efficiently create the web site and the processing and memory resources otherwise consumed with the development and storage of all of the web pages of a web site are conserved. Although the label, the address and the data may be stored in various manners, the label, the address and the data may be stored as a document object model (DOM) in an example embodiment.

Although various types of labels may be associated with a web page, the label may provide an indication of the subject matter of the respective web page and, in one embodiment, uniquely identifies the respective web page. As for the address, the web page may be addressed in various manners. In an example embodiment, the address for a respective web page is a uniform resource locator (URL) that is interpretable by the computer system that hosts the web site in order to provide for navigation to the web page associated with the respective address. The web page associated with the address may provide content, at least some of which serves as the content that is displayed upon user selection of the link for the respective web page.

As to the data associated with the respective web page, the data may include data that is loaded and presented upon viewing the web page in order to provide the content for the web page. The data may be provided as content in addition to content provided by the web page associated with the address, or the data may identify which of the content provided by the web page associated with the address is to be displayed. The data is flexible and could be a single piece of information, or a complex object capturing the data on the respective web page. Although some data may be predefined, other portions of the data have been provided by, such as submitted by, the user when previously interacting with the respective web page. In this regard, while previously interacting with the web page (or an earlier web page in the navigation path), the user may have made various selections or entered various information that is then stored as data in association with the respective web page. Although the data may be submitted by the user while previously interacting with the respective web page, some of the data may have also been previously submitted by the user while interacting with other web pages that were viewed by the user in advance of the user's prior interaction with the respective web page. Thus, the data previously submitted by the user in conjunction with the respective web page, whether entered while viewing the respective web page or other web pages in the navigation path that lead to the respective web page, may be stored by the memory device 14 in association with the respective web page.

As shown in block 32 of FIG. 2, the user interface navigation system 10 also includes means, such as the processing circuitry 12, the user interface circuitry 18 or the like, configured to receive a selection, such as by the user, of a link to a target web page. The link that is selected may be presented in various manners, such as by user selection of a clickable link embedded within a web page or by user selection of a link included within a navigation path and representative of a prior web page that was previously visited, but that is not currently being viewed. In this regard, a browser may track the user interaction and may notify or activate respective listeners or other navigation system functions that are registered to receive notice of user input in conjunction with respective regions of the display that coincide with corresponding links. The user interface circuitry 18 may include or otherwise be in communication with the listeners or other navigation system functions so as to receive notice of the user input in conjunction with a respective link.

Figure 3:
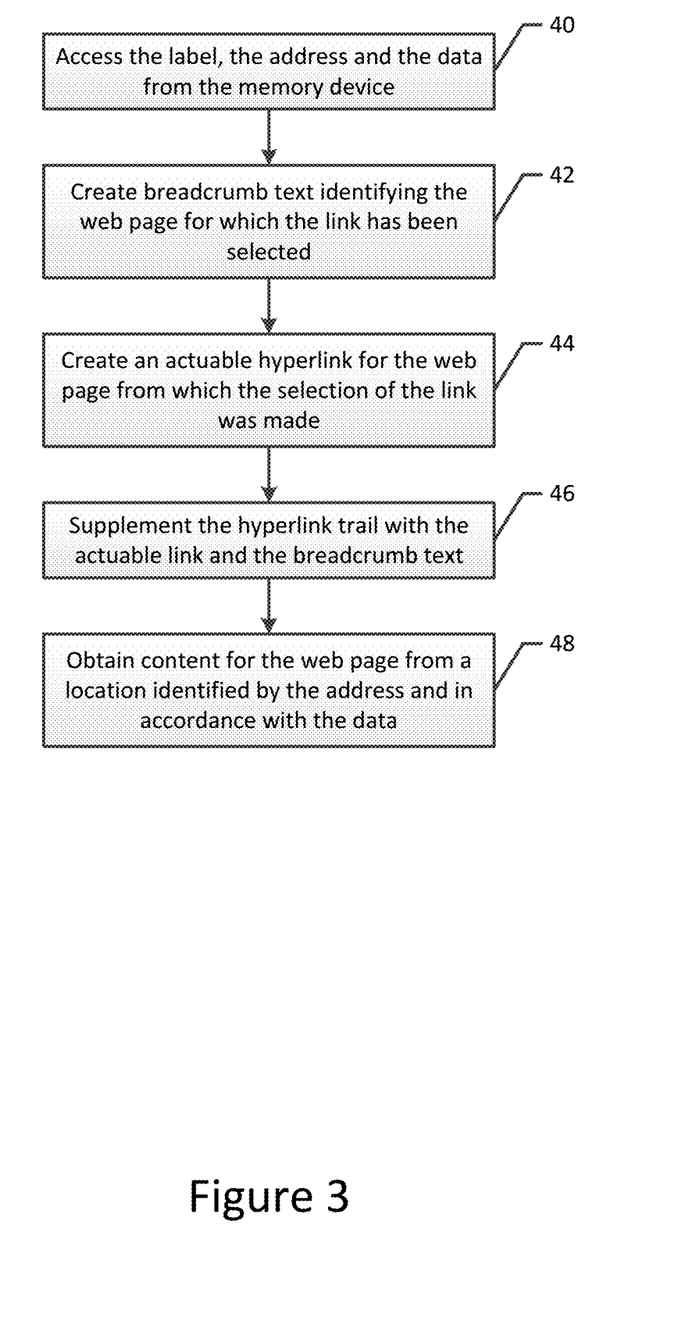
FIG. 3 is a flowchart illustrating operations performed, such as by the user interface navigation system of FIG. 1, in order to dynamically create a web page in accordance with an example embodiment of the present disclosure.

In the embodiment in which a target web page is selected by user actuation of a link and as shown in block 34 of FIG. 2, the user interface navigation system 10 also includes means, such as the processing circuitry 12, the navigation circuitry 22 or the like, configured to dynamically create and access the target web page in response to the selection of the link. In this regard, FIG. 3 depicts the operations associated with the dynamic creation and access of a web page in accordance with one embodiment. As shown in block 40 of FIG. 3, for example, the user interface navigation system 10, such as the processing circuitry 12, the navigation circuitry 22 or the like, is configured to access from the memory device 14 the label for the web page, the address of the web page and data associated with the web page. The user interface navigation system 10, such as the processing circuitry 12, the navigation circuitry 22 or the like, is also configured to create breadcrumb text identifying the web page for which the link has been selected. See block 42 of FIG. 3. The breadcrumb text identifies or is otherwise representative of the web page and, in one embodiment, may be the same as or some variant of the label. Although the breadcrumb text is representative of the web page in a hyperlink trail to the web page as described below, the breadcrumb text is not actuable and, instead, merely serves to identify the web page within the hyperlink trail.

In an embodiment in which the link for the target web page was presented by and selected by the user from another web page, that is, a prior web page, the user interface navigation system 10, such as the processing circuitry 12, the navigation circuitry 22 or the like, is also configured to create an actuable hyperlink for the prior web page. See block 44 of FIG. 3. In this regard, the user interface navigation system 10, such as the processing circuitry 12, the navigation circuitry 22 or the like, of an example embodiment is configured to convert the breadcrumb text that previously represented the prior web page to an actuable hyperlink such that its subsequent selection will cause the user to return to the prior web page. In order to create an actuable hyperlink, a label associated with the link, an address, e.g., a URL, of the prior web page and data including, for example, data previously submitted by a user during their prior interaction with the web page may be stored, such as in the memory device 14, in association with the actuable link, thereby permitting the web page to be dynamically reconstructed upon selection of the actuable link.

As shown in block 46 of FIG. 3, the user interface navigation system 10 of an example embodiment, such as hyperlink maintenance circuitry 24 or the like, is configured to supplement the hyperlink trail that leads to the web page for which the link has been selected. In this regard, the hyperlink trail may be supplemented to include both the actuable link associated with the prior web page as well as the breadcrumb text associated with target web page for which the link was selected. By way of example, a user may be reviewing a web page having a hyperlink trail of RootWebPage/WebPage1 in which RootWebPage is an actuable link to a prior web page and WebPage1 is breadcrumb text associated with the current web page. As WebPage1 is breadcrumb text, WebPage 1 is not actuable even if a user attempts to select the text. However, the web page identified as WebPage 1 includes one or more links to other web pages. Upon user selection of a link associated with a second web page, an actuable link for the current web page is created and breadcrumb text for the target web page is also created. The hyperlink trail may then be supplemented so as to point to the target web page by replacing the breadcrumb text for the prior web page with an actuable link and by adding breadcrumb text for the target web page. Thus, the foregoing example of a hyperlink trail may be supplemented so as to now be: RootWebPage/WebPage1/WebPage2 in which WebPage1 is now an acutable link to the prior web page and WebPage2 is breadcrumb text that serves to identify the target web page, even though WebPage2 is not actuable.

As shown in block 48 of FIG. 3, the user interface navigation system 10, such as the navigation circuitry 22 or the like, is configured to obtain content for the target web page from a location identified by the address and in accordance with the data. Thus, the content of the target web page is provided by the web page identified by the address, as filtered and/or supplemented in accordance with the data including, for example, data previously provided by a user during prior interaction with the web page or a preceding web page in the navigation trail. By way of example in which the address includes a URL, the navigation circuitry 22 may be configured to obtain the content for the target web page by calling the URL and obtaining content for the target web page from the location identified by the URL, and also in accordance with the data which serves to supplement and/or filter the content obtained from the location identified by the URL. Returning now to FIG. 2 and, more particularly, block 36 of FIG. 2, the user interface navigation system 10 also includes means, such as the navigation circuitry 22 or the like, configured to access the target web page by causing the web page, including the content that has been obtained from a location identified by the address and in accordance with the data, to be displayed. As described below, the hyperlink trail that leads to the target web page is also generally displayed concurrent with the content or at least a portion of the content of the target web page.

Figure 4:
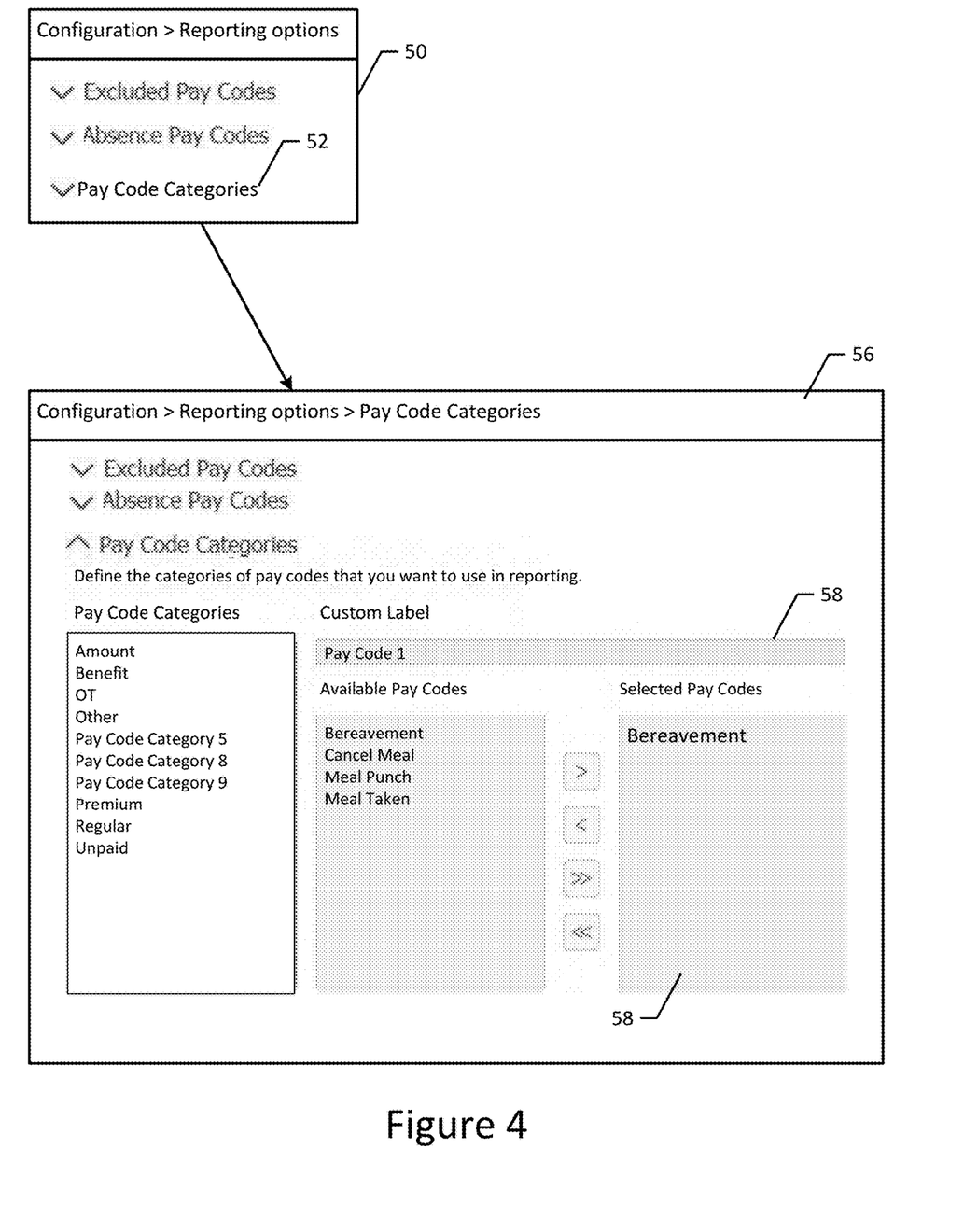
FIG. 4 is a graphical depiction of an initial web page and a subsequent web page that is dynamically created in response to the selection of a link from the initial web page in accordance with an example embodiment of the present disclosure.

One example of the navigation provided by the user interface navigation system 10, method and computer program product is provided by FIG. 4. In this example, a user may initially be viewing web page 50 that is identified by a hyperlink trail of Configuration>Reporting options. In this regard, "Reporting options" is breadcrumb text that identifies the current web page even though it is not actuable, while Configuration is an actuable link associated with a prior web page. Web page 50 includes three selectable links, namely, Excluded Pay Codes, Absence Pay Codes and Pay Code Categories. A label, address and data are associated with each of the links and are stored in the memory device 14. In response to user selection of the Pay Code Categories 52 link, the user interface navigation system 10, such as the navigation circuitry 22, dynamically creates and accesses the Pay Code Categories web page 56. In this regard, the navigation circuitry 22 accesses the label, the address and the data associated with the Pay Code Categories link from the memory device 14 and then dynamically creates the target web page so as to have content provided by the location identified by the address as supplemented or filtered by the data. Additionally, the navigation circuitry 22 supplements the hyperlink trail to the target web page by creating an actuable link for the Reporting options web page 50 as well as breadcrumb text associated with target web page. With reference to the Pay Code Categories web page 56, the hyperlink trail is supplemented so as to be Configuration>Reporting options>Pay Code Categories with Configuration and Reporting options being actuable links to respective web pages and Pay Code Categories being breadcrumb text that is representative of the target web page, but that is not actuable.

Once the web page is displayed, the user may interact with the web page and create additional data that is, in turn, stored by the memory device 14 in association with the web page. For example, the Custom Label of Pay Code 1 and the Selected Pay Code of Bereavement may be stored as data associated with the web page. As described below, this data may be utilized in instances in which the user navigates away from the web page, only to thereafter return to the same page. By having stored the data, the web page may be presented upon the return thereto so as to include the prior user selections, thereby improving the user experience and increasing the efficiency with which a user interacts with a web site by limiting or avoiding the re-entry of such data.

In some embodiments, the selection of web page may be based, not upon the selection of a link within a web page itself, but instead upon the selection of a hyperlink representative of a prior web page from the navigation path. In this regard, the prior web page is a web page that was previously visited as part of the current navigation path, but that is not currently being viewed. The selection of the prior web page from the navigation path may be performed in various manners, such as by selecting a "back" button. By way of example, however, the navigation path may be represented by the hyperlink trail, that is, the series of hyperlinks arranged in the order in which the user has accessed the web pages represented by the respective hyperlinks. As such, the hyperlink trail defines the navigation path of the user from the root web page to the current web page being viewed.

Figure 5:
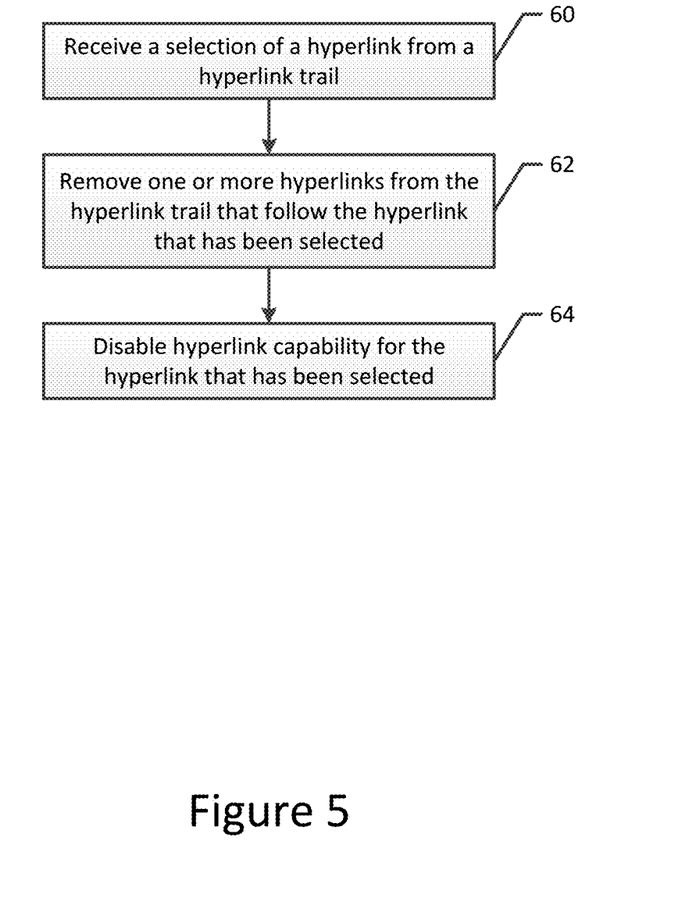
FIG. 5 is a flowchart illustrating operations performed, such as by the user interface navigation system of FIG. 1, in order to respond to the receipt of the selection of a hyperlink from the hyperlink trail in accordance with an example embodiment of the present disclosure.
Figure 6:
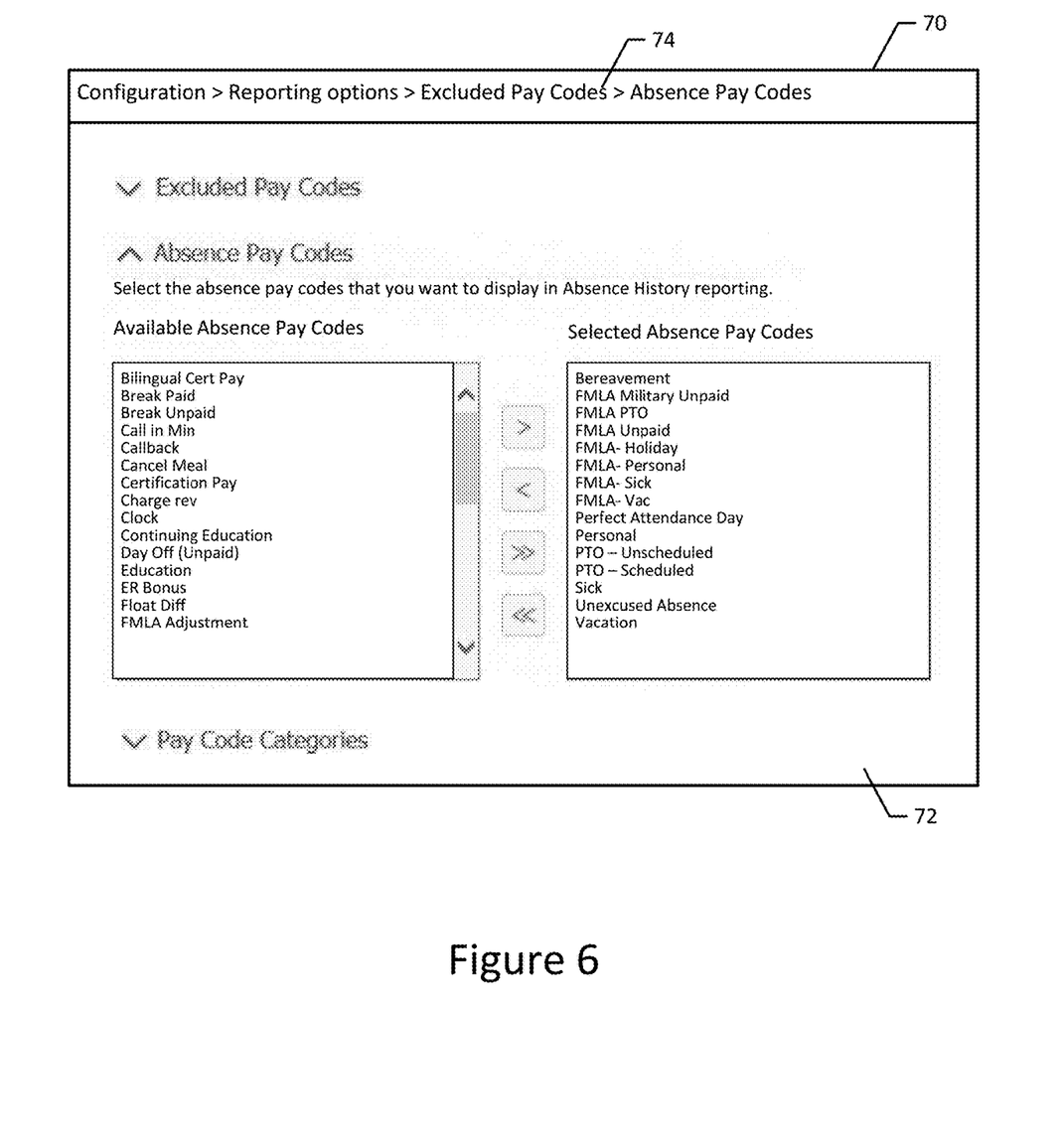
FIG. 6 depicts an example of a web page in which a hyperlink from the hyperlink trail is selected.

In this example embodiment, the user interface circuitry 18 may be configured to receive the selection of a prior web page by receiving the selection of a hyperlink from the hyperlink trail as shown in block 60 of FIG. 5. By way of further example, FIG. 6 depicts a web page that is currently being viewed by a user. The web page includes a header portion 70 and a body or content portion 72. The header includes a navigation trail comprised of a plurality of hyperlinks ordered in the sequence in which the web pages associated with each of the respective hyperlinks were accessed by the user. In this regard, the Configuration hyperlink represents the root web page with the Reporting Options web page, the Excluded Pay Codes web page and the Absence Pay Codes web pages then having been accessed in sequence by the user with the web page associated with the Absence Pay Codes currently being viewed. As such, the Configuration hyperlink, the Reporting Options hyperlink and the Excluded Pay Codes hyperlink are associated with prior web pages from the navigation path. As such, the user input circuitry 18 of this example embodiment is configured to receive the selection of one of the hyperlinks associated with a prior web page, such as the Excluded Pay Codes hyperlink 54.

The user interface navigation system 10 also includes means, such as the processing circuitry 12, the access circuitry 20 or the like, configured to access, in response to the selection of a prior web page from the navigation path, the label, the address and the data associated with the prior web page that have been maintained by the memory device 14 for the prior web page. The user interface navigation system 10 also includes means, such as the processing circuitry 12, the navigation circuitry 22 or the like, configured, in response to the selection of the prior web page from the navigation path and the access of the memory device 14 to obtain the label, the address and the data associated with the prior web page, to navigate directly to the prior web page and to cause the prior web page including a representation of at least some of the data to be displayed, such as upon the user interface 16.

By navigating directly to the prior web page, the user interface navigation system 10 of this example embodiment need not revert or return to the root web page in order to solicit additional user input to direct the computer system to the desired web page, unless, of course, the prior web page that is selected is the root web page. Instead, the navigation circuitry 22 relies upon the label, the address and the data associated with the prior web page that are accessed from the memory device 14 and navigates directly to the prior web page from the currently viewed web page. Additionally, by accessing the data associated with the prior web page including data provided by the user prior to or while the user was previously viewing the prior web page, the navigation circuitry 22 of this example embodiment is configured to cause the prior web page to be displayed without resubmittal of data by the user. In this regard, the data stored by the memory device 14 that is associated with the prior web page including data that has been previously provided by the user in conjunction with their prior interaction with the prior web page is loaded in order to form at least a portion of the content of the prior web page. By causing the prior web page to be displayed without resubmittal of data by the user, the user experience is improved in that the user may more efficiently move between prior web pages in a direct manner without having to resubmit data. Further, the operational efficiency of the computer system that hosts the web site is improved by avoiding unnecessary redirection to the root web page and unnecessary resubmittal of data by the user, thereby permitting the computer system to operate in a more efficient manner with reduced consumption of processing resources.

Figure 7:
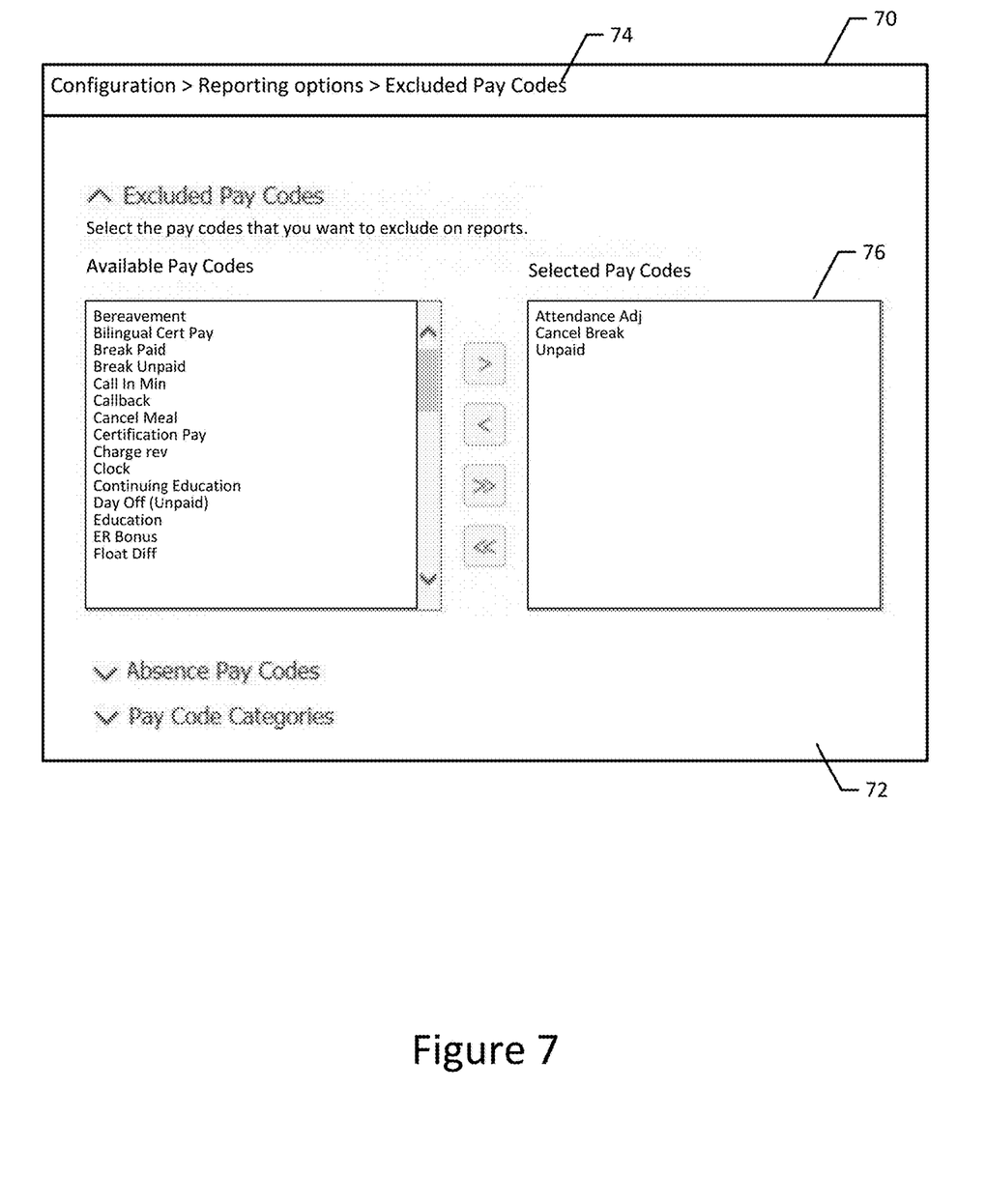
FIG. 7 represents the prior web page that is displayed following selection of the hyperlink from the hyperlink trail with the display of the prior web page including data associated with the respective web page such as data previously submitted by the user in accordance with an example embodiment of the present disclosure.

In relation to the example embodiment in which the selection of a prior web page from the navigation path is provided by the selection of a hyperlink associated with a prior web page from the hyperlink trail, reference again made to FIGS. 5 and 6 in which the selection of the Excluded Pay Codes hyperlink 74 from the hyperlink trail provided by the header 70 of the web page causes the direct navigation to the prior Excluded Pay Codes web page as shown in FIG. 7. In addition to directly navigating to the prior web page, the user interface navigation system 10 of this example embodiment includes means, such as the processing circuitry 12, the hyperlink maintenance circuitry 24 or the like, configured to remove one or more hyperlinks from the hyperlink trail that follow the hyperlink that has been selected, as shown in block 62 of FIG. 5. In this regard, the selection of the Excluded Pay Codes hyperlink 74 from the hyperlink trail of FIG. 6 causes navigation directly to the prior Excluded Pay Codes web page of FIG. 7. As shown by a comparison of the header portions 70 of the web pages of FIGS. 6 and 7, the hyperlink maintenance circuitry 24 has removed the Absence Pay Codes hyperlink from the hyperlink trail since the Absence Pay Codes hyperlink followed the Excluded Pay Codes hyperlink 74 that was selected from the hyperlink trail of FIG. 6. As such, the hyperlink maintenance circuitry 24 is configured to automatically maintain the hyperlink trail as the user returns to prior web pages.

Additionally, the user interface navigation system 10 of this example embodiment includes means, such as the processing circuitry 12, the hyperlink maintenance circuitry 24 or the like, configured to disable the hyperlink capability for the hyperlink that has been selected from the hyperlink trail as shown in block 64 of FIG. 3. By way of example, in response to the selection of the Excluded Pay Codes hyperlink 74 from the hyperlink trail of FIG. 6, the Excluded Pay Codes web page is displayed as shown in FIG. 7 and the hyperlink capability of the Excluded Pay Codes hyperlink 64 is disabled with the reference to the Excluded Pay Codes in the hyperlink trail of FIG. 7 serving as breadcrumb text to identify, but not to permit actuation of the respective page. As such, selection of the Excluded Pay Codes link in the header portion 70 of the web page of FIG. 7 no longer provides a hyperlink capability.

The web pages may include a variety of content. As such, the data that is stored by the memory device 14 and that is subsequently accessed during the navigation to a web page may be any of a wide variety of types of data. In one embodiment in which the web site is related to a time and attendance application, such as employed by a human resources department, the content of the web pages may relate to various policies. As such, the data associated with a web page may include the identity of a policy. As such, in response to selection of the web page of this example embodiment, the navigation circuitry 22 is configured to cause the web page to be displayed by causing the policy identified by the data to be loaded and displayed. In regards to the examples of FIGS. 6 and 7, Excluded Pay Codes, Absence Pay Codes and Pay Code Categories are three different policies that comprise the Reporting Options feature.

In addition to loading and displaying the policy identified by the data, data previously provided by the user in conjunction with the prior web page is also loaded and displayed by the navigation circuitry 22. For example, upon a return to the Excluded Pay Codes web page, the data representative of the pay codes that were previously selected by the user upon the user's prior interaction with the web page are loaded and displayed. In this regard, the selected pay codes 76 of Attendance Adj, Cancel Break and Unpaid were previously selected by the user during their prior interaction with the Excluded Pay Codes web page and are now accessed from the memory device 14, loaded and displayed by the navigation circuitry 22 upon selection of the Excluded Pay Codes hyperlink 74 from the hyperlink trail.

In order to facilitate the direct navigation to a prior web page, the memory device 14 is initially populated by the developer upon the construction of a web site and is thereafter further populated as a user navigates from one web page to another. In this regard, the user interface navigation system 10 includes means, such as the processing circuitry 12, the user input circuitry 18 or the like, that is configured to receive the selection of another web page from within the web page that is currently displayed. The user interface navigation system 10 of this example embodiment also includes means, such as the processing circuitry 12, the navigation circuitry 22 or the like, that is further configured, in response to the selection of another web page, to navigate to another web page and to cause the another web page to be displayed as described above in conjunction with FIG. 2. Further, the user interface navigation system 10 of this example embodiment includes means, such as the memory device 14 or the like, to store the label for the web page that was previously displayed upon the selection of the another web page, the address for the web page that was previously displayed upon the selection of the another web page and the data associated with the web page that was previously displayed upon the selection of the another web page including data provided by the user during (or prior to) interaction with the web page that was previously displayed during the selection of the another web page. As referenced in this context, the web page that was previously displayed is the web page that was being currently displayed at the time that the selection of the another web page was made. By storing the label, the address and the data associated with the web page that was previously displayed upon the selection of the another web page, the user interface navigation system 10 may directly navigate back to the web page from which the another web page was selected in response to a subsequent selection by the user of a return to the same web page. As also described above, the user interface navigation system 10 of this example embodiment may also include means, such as the processing circuitry 12, the hyperlink maintenance circuitry 24 or the like, configured to update, in response to the selection of the another web page, the hyperlink trail to include the hyperlink associated with the another web page. Thus, the hyperlink maintenance circuitry 24 is configured to automatically update or create the hyperlink trail as additional web pages are visited.

FIGS. 2, 3 and 5 illustrate operations of a user interface navigation system 10, method and computer program product according to some example embodiments. It will be understood that each operation of the flowcharts, and combinations of operations in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, memory device 14) storing instructions executable by a processor in the computing device (for example, by processing circuitry 12). In some example embodiments, the computer program instructions of the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, database system 10 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Moreover, it will be appreciated that the figures are each provided as examples and should not be construed to narrow the scope or spirit of the disclosure in any way. In this regard, the scope of the disclosure encompasses many potential embodiments in addition to those illustrated and described herein. Numerous other configurations may also be used to implement embodiments of the present invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A user interface navigation system comprising:
a memory device configured to maintain, for a web page, a label for the respective web page, an address for the respective web page and data associated with the respective web page;
wherein the data comprises data previously submitted by a user in conjunction with the respective web page;
user input circuitry configured to thereafter receive a selection of a link to the web page; and
navigation circuitry configured to dynamically create and access the web page in response to the selection of the link,
wherein the navigation circuitry is configured to dynamically create the web page by accessing the label for the web page, the address for the web page and the data associated with the web page from the memory device, create breadcrumb text based on the label to supplement a hyperlink trail to the web page and obtain content for the web page from a location identified by the address and in accordance with the data, wherein the breadcrumb text identifies the web page but is not actuable,
wherein the navigation circuitry is configured to access the web page by causing the web page including the content that has been obtained to be displayed; and
wherein the content is supplemented in accordance with the data previously submitted by the user in conjunction with the web page.

2. A user interface navigation system according to claim 1 further comprising hyperlink maintenance circuitry configured to supplement the hyperlink trail to the web page so as to include the breadcrumb text.

3. A user interface navigation system according to claim 1 wherein the address comprises a uniform reference locator (URL), and wherein the navigation circuitry is configured to obtain content for the web page by calling the URL and obtaining content for the web page from the location identified by the URL and in accordance with the data.

4. A user interface navigation system according to claim 1 wherein the navigation system is further configured to dynamically create an actuable hyperlink for the web page in response to the selection of the link.

5. A user interface navigation system according to claim 4 wherein the user input circuitry is further configured to receive a selection of another web page from within the web page that is currently displayed, wherein the navigation circuitry is further configured, in response to the selection of the another web page, to dynamically create and access the another web page and cause the another web page to be displayed, and wherein the user interface navigation system further comprises hyperlink maintenance circuitry configured to update, in response to the selection of the another web page, the hyperlink trail to convert the breadcrumb text associated with the web page displayed upon the selection of the another web page into the actuable hyperlink for the web page and to include the breadcrumb text in the hyperlink trail associated with the another web page.

6. A user interface navigation system according to claim 1 wherein the user input circuitry is further configured to receive the selection of a hyperlink from the hyperlink trail, and wherein the user interface navigation system further comprises hyperlink maintenance circuitry configured to remove the breadcrumb text and any hyperlinks from the hyperlink trail that follow the hyperlink that has been selected.

7. A user interface navigation system according to claim 6 wherein the hyperlink maintenance circuitry is further configured to disable hyperlink capability for the hyperlink that has been selected with the hyperlink that has been selected being converted to breadcrumb text that identifies the web page but that is not actuable.

8. A method for facilitating user interface navigation, the method comprising:
maintaining, for a web page, a label for the respective web page, an address for the respective web page and data associated with the respective web page;
wherein the data comprises data previously submitted by a user in conjunction with the respective web page;
receiving a selection of a link to the web page; and
dynamically creating and accessing the web page in response to the selection of the link,
wherein dynamically creating the web page comprises accessing the label for the web page, the address for the web page and the data associated with the web page from the memory device, creating breadcrumb text based on the label to supplement a hyperlink trail to the web page and obtaining content for the web page from a location identified by the address and in accordance with the data, wherein the breadcrumb text identifies the web page but is not actuable,
wherein accessing the web page comprises causing the web page including the content that has been obtained to be displayed; and
wherein the content is supplemented in accordance with the data previously submitted by the user in conjunction with the web page.

9. A method according to claim 8 further comprising supplementing the hyperlink trail to the web page so as to include the breadcrumb text.

10. A method according to claim 8 wherein the address comprises a uniform reference locator (URL), and wherein obtaining content for the web page comprises calling the URL and obtaining content for the web page from the location identified by the URL and in accordance with the data.

11. A method according to claim 8 further comprising dynamically creating an actuable hyperlink for the web page in response to the selection of the link.

12. A method according to claim 11 further comprising:
receiving a selection of another web page from within the web page that is currently displayed;
in response to the selection of the another web page, dynamically creating and accessing the another web page and causing the another web page to be displayed; and
updating, in response to the selection of the another web page, the hyperlink trail to convert the breadcrumb text associated with the web page displayed upon the selection of the another web page into the actuable hyperlink for the web page and to include the breadcrumb text in the hyperlink trail associated with the another web page.

13. A method according to claim 8 further comprising:
receiving the selection of a hyperlink from the hyperlink trail; and
removing the breadcrumb text and any hyperlinks from the hyperlink trail that follow the hyperlink that has been selected.

14. A method according to claim 13 further comprising disabling hyperlink capability for the hyperlink that has been selected with the hyperlink that has been selected being converted to breadcrumb text that identifies the web page but that is not actuable.

15. A computer program product configured to provide user interface navigation, the computer program product comprising at least one non-transitory computer-readable storage medium having computer-executable program code instructions stored therein, the computer-executable program code instructions comprising program code instructions configured to:
maintain, for a web page, a label for the respective web page, an address for the respective web page and data associated with the respective web page;
wherein the data comprises data previously submitted by a user in conjunction with the respective web page;
receive a selection of a link to the web page; and
dynamically create and access the web page in response to the selection of the link,
wherein the program code instructions configured to dynamically create the web page comprise program code instructions configured to access the label for the web page, the address for the web page and the data associated with the web page, create breadcrumb text based on the label to supplement a hyperlink trail to the web page and obtain content for the web page from a location identified by the address and in accordance with the data, wherein the breadcrumb text identifies the web page but is not actuable,
wherein the program code instructions configured to access the web page comprise program code instructions configured to cause the web page to include the content that has been obtained to be displayed; and
wherein the content is supplemented in accordance with the data previously submitted by the user in conjunction with the web page.

16. A computer program product according to claim 15 wherein the computer-executable program code instructions further comprise program code instructions configured to supplement the hyperlink trail to the web page so as to include the breadcrumb text.

17. A computer program product according to claim 15 wherein the address comprises a uniform reference locator (URL), and wherein the program code instructions configured to obtain content for the web page comprise program code instructions configured to call the URL and obtain content for the web page from the location identified by the URL and in accordance with the data.

18. A computer program product according to claim 15 wherein the computer-executable program code instructions further comprise program code instructions configured to dynamically create an actuable hyperlink for the web page in response to the selection of the link.

19. A computer program product according to claim 18 wherein the computer-executable program code instructions further comprise program code instructions configured to:
receive a selection of another web page from within the web page that is currently displayed;
in response to the selection of the another web page, dynamically create and access the another web page and cause the another web page to be displayed; and
update, in response to the selection of the another web page, the hyperlink trail to convert the breadcrumb text associated with the web page displayed upon the selection of the another web page into the actuable hyperlink for the web page and to include the breadcrumb text in the hyperlink trail associated with the another web page.

20. A computer program product according to claim 15 wherein the computer-executable program code instructions further comprise program code instructions configured to:
receive the selection of a hyperlink from the hyperlink trail;
remove the breadcrumb text and any hyperlinks from the hyperlink trail that follow the hyperlink that has been selected; and
disable hyperlink capability for the hyperlink that has been selected with the hyperlink that has been selected being converted to breadcrumb text that identifies the web page but that is not actuable.

* * * * *